US007707074B1

(12) United States Patent
Cotton et al.

(10) Patent No.: US 7,707,074 B1
(45) Date of Patent: Apr. 27, 2010

(54) ONLINE MARKETPLACE CHANNEL ACCESS

(75) Inventors: Mark F. Cotton, Danville, CA (US); Allen J. Delattre, Manhattan Beach, CA (US); Kevin P. Reedy, Fremont, CA (US); Chris L. Remy, Portland, OR (US)

(73) Assignee: Accenture Global Services GmbH, Schaffhausen (CH)

( * ) Notice: Subject to any disclaimer, the term of this patent is extended or adjusted under 35 U.S.C. 154(b) by 1578 days.

(21) Appl. No.: 10/658,671

(22) Filed: Sep. 8, 2003

(51) Int. Cl.
*G06F 17/30* (2006.01)

(52) U.S. Cl. .............................. 705/27; 705/26; 705/28

(58) Field of Classification Search .................. 705/26, 705/27, 28
See application file for complete search history.

(56) References Cited

U.S. PATENT DOCUMENTS

| 5,424,944 | A | * | 6/1995 | Kelly et al. ................... 705/28 |
| 5,664,111 | A | | 9/1997 | Nahan et al. |
| 5,845,265 | A | | 12/1998 | Woolston |
| 5,946,662 | A | * | 8/1999 | Ettl et al. ........................ 705/8 |
| 5,960,411 | A | | 9/1999 | Hartman et al. |
| 6,029,141 | A | | 2/2000 | Bezos et al. |
| 6,035,288 | A | | 3/2000 | Solomon |
| 6,041,308 | A | | 3/2000 | Walker et al. |
| 6,058,417 | A | | 5/2000 | Hess et al. |
| 6,064,980 | A | | 5/2000 | Jacobi et al. |
| 6,085,169 | A | | 7/2000 | Walker et al. |
| 6,085,176 | A | | 7/2000 | Woolston |
| 6,202,051 | B1 | | 3/2001 | Woolston |
| 6,266,649 | B1 | | 7/2001 | Linden et al. |
| 6,317,722 | B1 | | 11/2001 | Jacobi et al. |
| 6,343,273 | B1 | | 1/2002 | Nahan et al. |
| 6,356,878 | B1 | | 3/2002 | Walker et al. |
| 6,415,320 | B1 | | 7/2002 | Hess et al. |
| 6,466,917 | B1 | | 10/2002 | Goyal et al. |
| 6,466,918 | B1 | | 10/2002 | Spiegel et al. |
| 6,484,153 | B1 | | 11/2002 | Walker et al. |
| 6,523,037 | B1 | | 2/2003 | Monahan et al. |
| 6,553,346 | B1 | | 4/2003 | Walker et al. |
| 6,604,107 | B1 | | 8/2003 | Wang |
| 7,249,059 | B2 | | 7/2007 | Dean et al. |
| 7,359,871 | B1 | | 4/2008 | Paasche et al. |
| 7,440,908 | B2 | * | 10/2008 | Snapp et al. ................... 705/10 |
| 2001/0037245 | A1 | | 11/2001 | Ranganath et al. |
| 2002/0023004 | A1 | | 2/2002 | Hollander et al. |
| 2002/0032597 | A1 | | 3/2002 | Chanos |
| 2002/0099678 | A1 | * | 7/2002 | Albright et al. ............... 706/45 |

(Continued)

OTHER PUBLICATIONS

Amazon: "Amazon.com Auctions Helps Online Sellers Become Effective Marketers," PR Newswire, Aug. 18, 1999, Proquest #44014963, 4pgs.*

(Continued)

*Primary Examiner*—Robert M. Pond
(74) *Attorney, Agent, or Firm*—Fish & Richardson P.C.

(57) ABSTRACT

Facilitating access to an online sales channel may involve receiving information describing one or more items for sale by each of multiple sellers, facilitating a sale of the items through one or more online sales channels, and facilitating fulfillment of sold items through one or more fulfillment centers controlled by a connection provider. At least one fulfillment center is operated with respect to the sold items according to one or more parameters tailored to a common feature of the sold items.

19 Claims, 7 Drawing Sheets

U.S. PATENT DOCUMENTS

| | | | |
|---|---|---|---|
| 2002/0116302 | A1 | 8/2002 | Wilmes et al. |
| 2002/0156685 | A1 | 10/2002 | Ehrlich et al. |
| 2002/0169640 | A1 | 11/2002 | Freeland |
| 2002/0169658 | A1 | 11/2002 | Adler |
| 2002/0169676 | A1 | 11/2002 | Floyd |
| 2003/0014350 | A1 | 1/2003 | Duell et al. |
| 2003/0033205 | A1* | 2/2003 | Nowers et al. ............... 705/26 |
| 2003/0154134 | A1 | 8/2003 | Wang |
| 2004/0015415 | A1 | 1/2004 | Cofino et al. |
| 2005/0033648 | A1* | 2/2005 | Jin et al. ...................... 705/26 |
| 2005/0055281 | A1 | 3/2005 | Williams |
| 2005/0171858 | A1 | 8/2005 | Cotton et al. |
| 2005/0197909 | A1 | 9/2005 | Klenske |
| 2005/0197946 | A1 | 9/2005 | Williams et al. |
| 2005/0203804 | A1 | 9/2005 | Suzuki |
| 2006/0190352 | A1 | 8/2006 | Zeidman |
| 2008/0262865 | A1 | 10/2008 | Cotton et al. |

OTHER PUBLICATIONS

Accenture: "eBay, Accenture to link consumers to manufacturer' and retailers' inventories," Electronic Commerce New, May 13, 2002, v7i10pg1, Proquest #119400039, 3pgs.*

Connection to eBay; "eBay and Accenture unveil new service . . . ," Business Wire, May 7, 2002; Proquest #1181166491, 3pgs.*

Keefe, Collin; "Where haves meet wants," Dealerscope, Jan. 2002; v44i1,p. 50; Proquest #988243388, 9pgs.*

Jabil Circuit, "Jabil Global Services", http://www.jabil.com/1048.asp May 28, 2004.

Jabil Circuit, "Returns", http://www.jabil.com/1037.asp, May 28, 2004.

Andale, "Smart Tools and Services to Help you Sell on eBay", http://www.andale.com/corp/products/products.jsp May 28, 2004.

Andale, "Sales Analyzer", http://www.andale.com/rep/rep_quickstart.jsp?foo=4379&resetStoresNav=y May 28, 2004.

"Operating Agreement", Amazon.com, http://affiliate-program.amazon.com/gp/associates/agreement/ref=amb_link_517882_10/103-5314425-4118200?pf_rd_m=ATVP.

Participation Agreement, http://amazon.com/gp/help/customer/display.html/002-5582521-1516869?ie-UTF8&nodeId=1161302&qid=1184600773&sr=2-1, (1 of 7), Jul. 16, 2007, 12:50:26 PM.

Priceline.com Incorporated Web Site Terms & Conditions, Agreement between User and priceline.com Incorporated, http://www.priceline.com/customerservice/faq/ShowHelp.asp?faq=ext(AIRPOP_TERMS), (1 of 20), Jul. 16, 2007, 12:49:36 PM.

"eBay", http://www.accenture.com/xd/xd.asp?it=enWeb&xd=industries/communications/alliances.

Troy Wolverton, "eBay-Accenture deal aimed at big guns", Cnet News.com, May 7, 2002; http://news.com/2100-1017-901190.html?tag=nl.

Troy Wolverton, "Accenture connects to eBay", Cnet News.com, Oct. 23, 2002; http://news.com/2102-1017-963086.html.

"Improving Inventory Turn and Value Online: What is your eBay Strategy?" A Connection to eBay White Paper, Apr. 2003.

Andale "Andale 2003 Einstein Product Showcase", downloaded from the internet at http://presstours.andale.com/search.html on Jul. 1, 2003, 10 pages.

Anderson, USPTO Office Action in U.S. Appl. No. 10/794,769 dated Nov. 30, 2007, 24 Pages, to be published by USPTO with the file history of this application.

Anderson, USPTO Office Action in U.S. Appl. No. 10/794,769 dated Jun. 25, 2008, 26 Pages, to be published by USPTO with the file history of this application.

Buterin, "Top Dog Sales Strategy", Purple Squirrel, Oct. 2001, downloaded from the internet at http://www.purplesquirrel.com/articles/2001/oct/buterin.shtml on Dec. 31, 2003, 3 pages.

Dunham, USPTO Office Action in U.S. Appl. No. 10/797,906 dated Jan. 8, 2007, 12 Pages, to be published by USPTO with the file history of this application.

Dunham, USPTO Office Action in U.S. Appl. No. 10/797,906 dated Jun. 20, 2007, 11 Pages, to be published by USPTO with the file history of this application.

Dunham, USPTO Office Action in U.S. Appl. No. 10/797,906 dated Sep. 22, 2008, 14 Pages, to be published by USPTO with the file history of this application.

Dunham, USPTO Office Action in U.S. Appl. No. 10/797,906 dated Mar. 26, 2009, 11 Pages, to be published by USPTO with the file history of this application.

Dunham, USPTO Office Action in U.S. Appl. No. 10/797,906 dated Jul. 23, 2009, 10 Pages, to be published by USPTO with the file history of this application.

Haider, USPTO Office Action in U.S. Appl. No. 10/794,583 dated Jul. 3, 2008, 6 Pages, to be published by USPTO with the file history of this application.

Haider, USPTO Office Action in U.S. Appl. No. 10/794,583 dated Dec. 10, 2008, 26 Pages, to be published by USPTO with the file history of this application.

Haider, USPTO Office Action in U.S. Appl. No. 10/794,583 dated Jun. 22, 2009, 8 Pages, to be published by USPTO with the file history of this application.

Haq, USPTO Office Action in U.S. Appl. No. 10/808,730 dated Jan. 9, 2007, 7 Pages, to be published by USPTO with the file history of this application.

Haq, USPTO Office Action in U.S. Appl. No. 10/808,730 dated May 1, 2007, 8 Pages, to be published by USPTO with the file history of this application.

Haq, USPTO Office Action in U.S. Appl. No. 10/808,730 dated Oct. 16, 2007, 19 Pages, to be published by USPTO with the file history of this application.

Haq, USPTO Office Action in U.S. Appl. No. 10/808,730 dated Jul. 17, 2008, 10 Pages, to be published by USPTO with the file history of this application.

* cited by examiner

ONLINE MARKETPLACE CHANNEL ACCESS

BACKGROUND

The following description relates to providing access to online marketplace services, for example, to allow sellers of property or merchandise to sell goods or items through an online auction. An online auction is an auction that occurs via one or more web sites in which people and organizations from all around the world can buy and sell goods and services. Among other goods and services, collectibles, books, jewelry, appliances, computers, tickets, sporting goods, furniture, equipment, vehicles, and vacation packages are listed on auction web sites, and bought and sold daily through the online auctions.

Participants in online auctions may include individuals, small companies, large corporations, or other types of organizations. In general, the term "organization" may refer to a company, enterprise, business, government, educational institution, or the like. The term "organization" can also refer to a group of persons, such as an association or society.

Some participants in online auctions may have business-to-business (B2B) relationships with other participants that may tend to focus on a vertical market, such as healthcare or automotive. Participants in a B2B auction can liquidate unwanted capital assets, dispose of excess inventory, and buy or sell equipment, goods, and services. Other participants in online auctions may have business-to-customer (B2C) or customer-to-business (C2B) relationships. A business may sell goods and services to the consumer market in a B2C online auction. In a C2B auction, consumers can determine what they're willing to pay for goods and businesses can decide whether or not to accept. Some other participants may have customer-to-customer (C2C) relationships, in which individuals can buy and sell goods and services with other individuals.

In one example of an online marketplace, eBay Inc. of San Jose, Calif. provides online services in which buyers and sellers can browse, buy and sell various goods and services in a web-based marketplace. eBay provides online auction services, in which eBay typically may not directly handle or own the goods. Instead, eBay can facilitate the listing of the goods and services, like want-ads in a newspaper, and facilitate transactions of trading activities between buyers and sellers. Among other operations, eBay can provide listing features beyond what can be offered in a newspaper, such as a dynamic pricing structure.

Online auctions can offer a dynamic pricing structure where buyers can compete for the goods and services. The online marketplace can provide flexible selling features to allow sellers to use multiple product categories, various auction start and end dates, different branding and listing approaches, and multiple pricing formats, including different types of auctions. Some of the various types of auctions may include normal, dutch, reverse, lots, and others. In a dutch auction, for example, a seller may offer multiple copies of the same item, and the winning bidders pay the amount of the lowest winning bid. In a reverse auction, sellers can bid against each other to win a buyer's business. For example, Priceline.com Inc. of Norwalk, Conn. sells airline tickets, hotel rooms, and additional products based on the price the consumer is willing to pay.

The online marketplace may also provide a fixed-priced format for selling goods and services. For example, the online marketplaces of eBay, Amazon.com, Inc. of Seattle Wash. and Buy.com, Inc. of Aliso Viejo, Calif. provide fixed-priced selling, in which the seller offers goods at a fixed, predetermined price. The price of the good may be a factor of the Manufacturer's Suggested Retail Price (MSRP), and/or the price of the same good from other sellers.

Online marketplaces represent a sales channel—that is, an avenue for selling goods or services—that has become popular only recently. More traditional sales channels include "brick-and-mortar" storefronts, for example, a department store in which a good (e.g., a shirt) can be sold to buyers of the good. Other sales channels include catalog sales, door-to-door sales, and telemarketing sales. A seller may use multiple sales channels to sell its goods or services—e.g., retail stores and an online sale channel such as a web site with similar product offerings. In the case of an online sales channel, a seller may either set-up and maintain its own dedicated web-site that sells only its own merchandise or the seller may use an online marketplace web-site (e.g. eBay, Amazon.com or Buy.com) that sells merchandise owned by several different sellers. As used herein, "online sales channel" encompasses both dedicated, single-seller online sales channels as well as multiple-seller online sales channels.

SUMMARY

In one implementation, the present disclosure relates to a method that includes receiving information describing items for sale by multiple sellers, facilitating a sale of the items through one or more online sales channels, and facilitating fulfillment of sold items through one or more fulfillment centers. The fulfillment centers are controlled by a connection provider, and at least one fulfillment center is operated with respect to the sold items according to one or more parameters tailored to a common feature of the sold items. The connection provider may be a non-title-taking intermediary that coordinates fulfillment of the sold items. The "items" can mean goods or services, or a combination of goods and services.

The operation of the fulfillment center may include one or more activities. For instance, the operation of the fulfillment center may include performing preparation activities in connection with fulfilling orders for the items. The preparation activities may be specific to the type of the item sold and may include refurbishment and/or fragmented inventory activities. The operation of the fulfillment center may include tailoring storage or handling characteristics of the fulfillment center to the type of items sold. The operation of the fulfillment center may include both (i) performing preparation activities in connection with fulfilling orders for the items and (ii) tailoring storage or handling characteristics of the fulfillment center to the type of items being sold. Alternatively, the operation of the fulfillment center may include an activity other than (i) performing preparation activities in connection with fulfilling orders for the items or (ii) tailoring storage or handling characteristics of the fulfillment center to the type of items being sold.

In accordance with the method, the sales facilitation may include providing customer service for one or more sellers, and/or providing billing services and collection services. Sales facilitation may further include providing online auction capabilities and listing tools, and monitoring a progress of the selling performance of the items. Moreover, information about the one or more items for sale may be prepared on one or more online sales channels. Alternatively, in addition to providing customer service for one or more sellers, sales facilitation may include developing a selling strategy, managing orders and transportation, and managing inventory for the items being sold.

Receiving information, according to the method, can include receiving a product definition file from a seller that describes the items to be sold at a SKU (Stock-Keeping Unit) level. A SKU refers to a unique identifier, usually alphanumeric, of a particular product that allows it to be tracked for inventory purposes. Alternatively, receiving information may include receiving product description information from an entity other than the seller, in which the entity can be a fragmented inventory fulfillment center.

In another implementation, the present disclosure relates to a method of facilitating access to an online sales channel. The method of facilitating access includes receiving information from multiple sellers, facilitating a sale of the items through one or more online sales channels, and facilitating fulfillment of sold items through one or more fulfillment centers controlled by a connection provider. At least one of the fulfillment centers is operated with respect to the sold items according to one or more parameters tailored to a common feature of the sold items. The information received from each seller describes one or more items for sale by that seller. The connection provider can offer connection services between one or more sellers and one or more online marketplaces. The connection provider may process the information from the sellers and select one or more fulfillment centers based on one or more parameters from the item being sold.

The present disclosure also describes a system with access to multiple online sales channels for selling items that are owned by multiple merchants. The system includes one or more fulfillment centers and a connection provider infrastructure. The connection provider infrastructure facilitates a sale of the items from one or more merchants on one or more online sales channels, and identifies and selects a fulfillment center, among multiple fulfillment centers, based upon at least one common feature of the items being sold. An intermediary that does not take title to the items being sold may control the connection provider infrastructure.

The connection provider infrastructure may include hardware and/or software tools. In one aspect, the infrastructure may include a repository to store information relating to a merchant, an online sales channel, a fulfillment center, and/or an item being sold. The infrastructure may also include a product data loading tool to receive an object with information for the items being sold, and a fulfillment order management system that interfaces with a fulfillment center. In another aspect, the infrastructure may include a financial tool to report one or more transactions of the items being sold to the merchant, and a customer service tool that interfaces with a buyer. The customer service tool includes contact information and a policy for an online sales channel and/or the connection provider.

The systems and techniques described here may provide one or more of the following advantages. For example, a connection provider can provide an alternative sales channel for a merchant or seller. The connection provider can employ and control one or more fulfillment centers that can be tailored to the specific items that are sold over the sales channels. Furthermore, the connection provider can offer efficiencies and economies of scale in operating tailored fulfillment centers, each of which can service multiple sellers with similar items. By providing fulfillment centers to a seller, the seller may have the flexibility of using its resources in areas other than fulfillment of its sold items.

The details of one or more implementations are set forth in the accompanying drawings and the description below. Other features and advantages will be apparent from the description and drawings, and from the claims.

DRAWING DESCRIPTIONS

Like reference symbols in the various drawings may indicate like elements.

DETAILED DESCRIPTION

Figure 1:
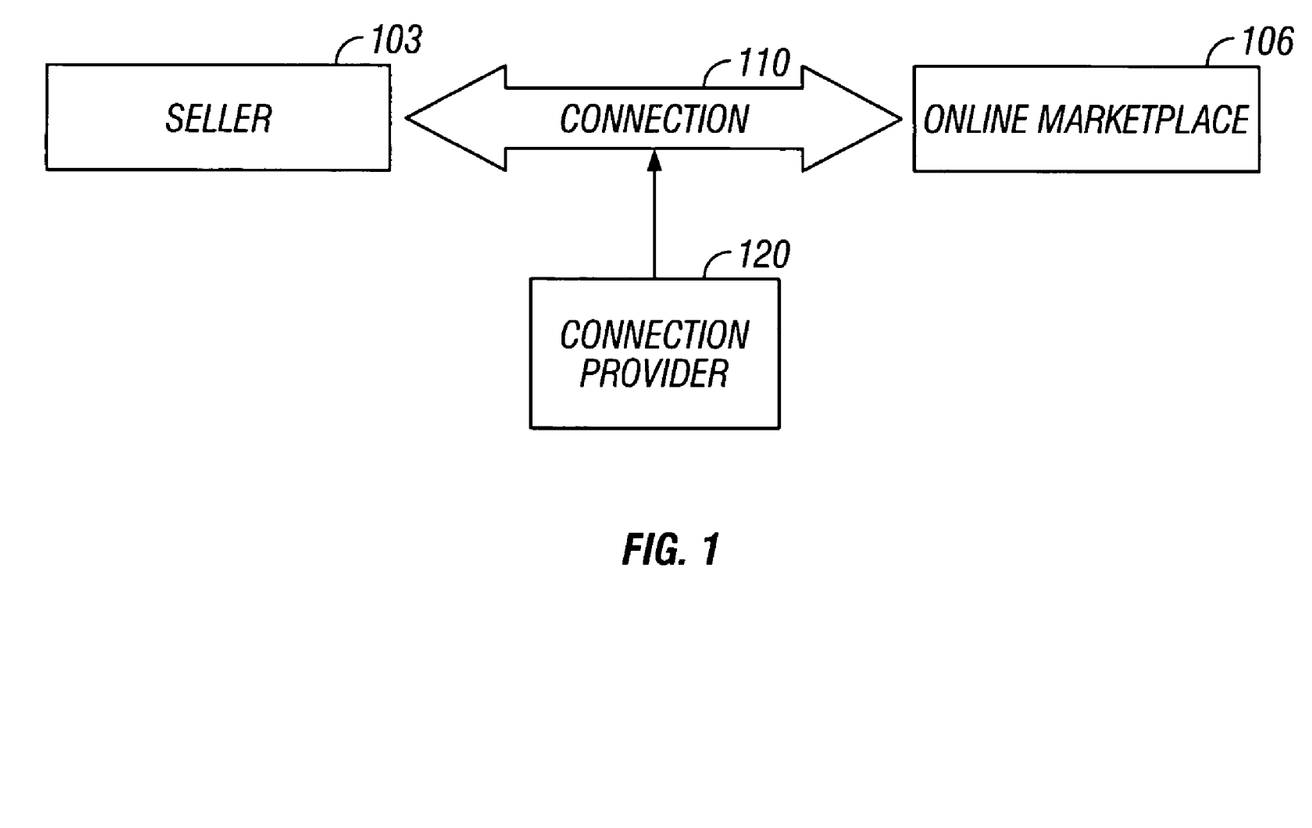
FIG. 1 is an exemplary block diagram of a connection between a seller and an online sales channel.

FIG. 1 is a block diagram of a connection 110 between a seller 103 and an online marketplace 106. The seller 103 may offer items to sell through the online marketplace sales channel 106. As used herein, "items" can mean goods—whether new, used or refurbished—services, or a combination of goods and services. In one implementation, the seller 103 can employ a connection provider 120 who will facilitate the connection 110 to one or more online marketplaces 106. The online marketplaces 106 may provide a primary or alternative sales channel for the seller 103. The one or more online marketplaces 106 may or may not be owned and/or controlled by the connection provider 120. Typically, the connection provider 120 is a separate legal entity from the online marketplaces 106 to which it provides a connection 110.

Examples of connection providers include Accenture Ltd., ChannelAdvisor Corp. and Auction Works, Inc. Examples of sellers include retails stores, department stores, electronic stores, music stores, online clothing stores, travel agencies, equipment vendors, etc. In addition, enterprises not ordinarily in the business of selling goods, a services provider, for example, may nevertheless find it beneficial to establish an online sales channel to sell items such as used computer equipment, office furniture, excess supplies and the like. Examples of online sales channels include eBay, Amazon, and Buy.com.

A seller 103 need not necessarily employ a connection provider 120 to develop an alternative sales channel on the online marketplace 106, but rather may develop the alternative sales channel using its own personnel and resources, for example, by accessing the online sales channel directly and listing its items for sale. Typically, directly listing items for sale on an online sales channel requires an investment of the seller's resources including personnel time, capital, and labor. For example, an automobile parts supplier may hire its own staff and purchase extra computers to list, for example, new or refurbished automobile parts on eBay.

Alternatively, the seller 103 may employ a third-party connection provider 120 to develop an alternative sales channel on the online marketplace 106. In that case, the seller 103 need not, for example, hire extra staff, buy additional equipment, or develop the in-house expertise for the alternative sales channel. Rather, the seller 103 can hire the connection provider 120 to outsource the development and maintenance of the alternative sales channel. In hiring the connection provider 120, the seller 103 may form a relationship or an account with the connection provider 120.

The present disclosure describes systems, methods, and techniques in which the connection provider 120 provides customized listing and fulfillment services to one or more sellers 103. In one implementation, the connection provider 120 develops and controls one or more fulfillment centers that are tailored to the specific items that are sold over the online sales channel. The items that are sold may have properties or characteristics that depend on the nature of the items. For example, certain items may require one or more services to be performed on them before they are in suitable condition for sale. For example, certain items may need to be refurbished, cleaned, altered, modified, inventoried, or otherwise processed before they are in appropriate condition for sale. Alternatively, or in addition, items for sale may have certain characteristics that require special handling or a particular environment in a fulfillment center before, during or after they are sold to a buyer. For example, a characteristic of a perishable food item may require that the food item is kept at a certain temperature during shipping or storage. In another example, a flower or plant may require certain lighting and watering conditions. The connection provider can provide the seller with a tailored fulfillment center that can accommodate one or more properties or characteristics of the items being sold.

The connection provider may also provide a fulfillment center that can fulfill the orders for multiple different merchants. The connection provider can offer efficiencies and economies of scale in operating tailored fulfillment centers that can service multiple sellers with similar items. By providing fulfillment centers to a seller, the seller may have the flexibility of using its resources in areas other than in fulfillment of its purchased items. As a result, the seller can sell its items efficiently and without the overhead that otherwise may be needed for online sales channel development, maintenance, and marketing. These advantages may further result in benefits such as a faster time-to-market for the seller and higher profit margins for the items sold. Moreover, by focusing resources and efforts on specialized areas for certain items, fulfillment centers may operate more efficiently and may have a higher level of expertise regarding the items they service.

Figure 5:
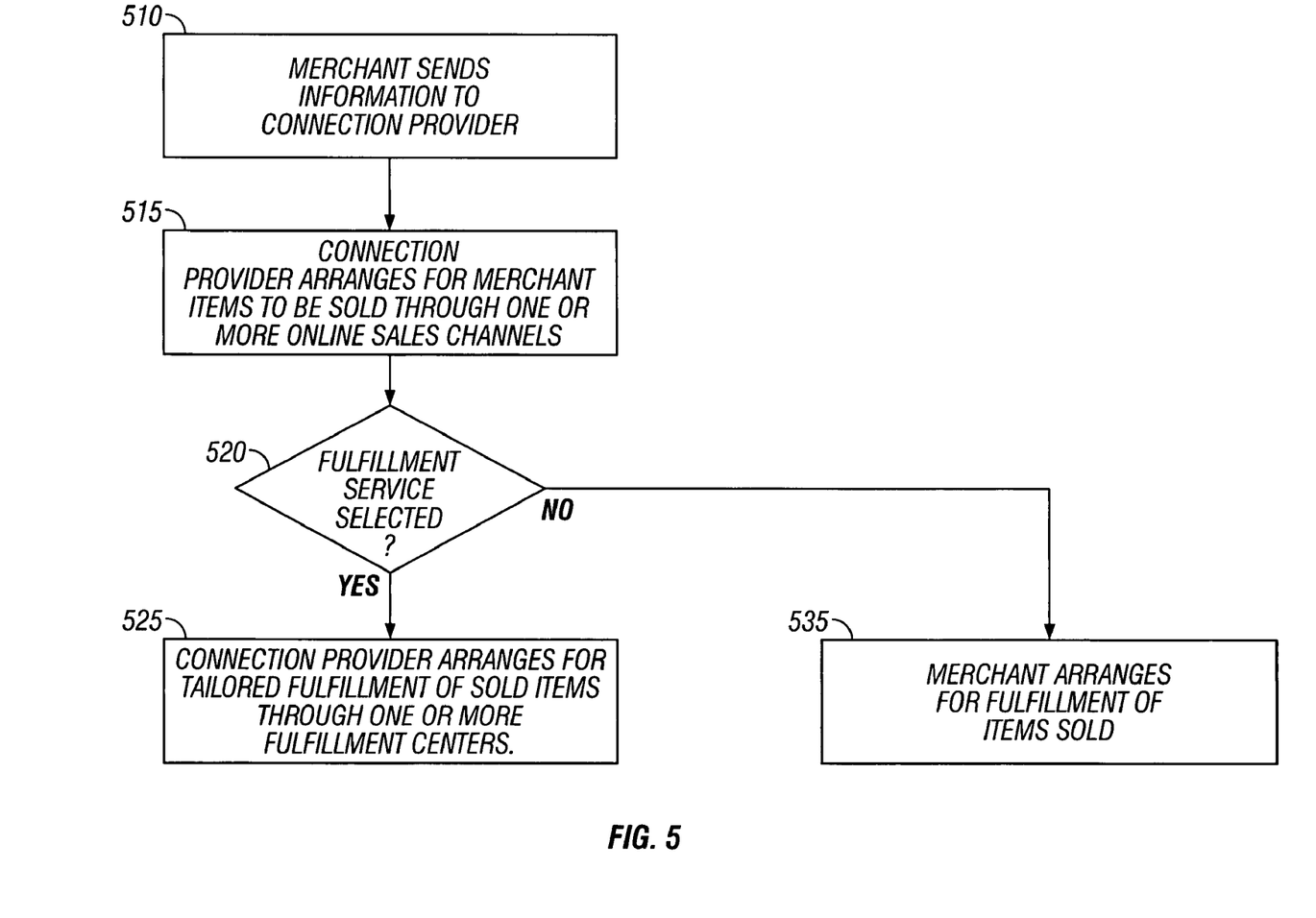
FIG. 5 is an illustrative flowchart of a process for selling items.

The seller can supply information about the items being sold to the connection provider—for example, in the form of an electronic document such as a Product Definition File—and the connection provider can use this information to arrange for the items to be sold on an online marketplace. The connection provider can supply different levels of service to the seller. In one level of service described below (FIG. 7), the merchant can fulfill the order through one or more tailored fulfillment centers. At another service level, the connection provider may also allow the seller to fulfill orders through the seller's own fulfillment centers (FIG. 5).

Figure 2:
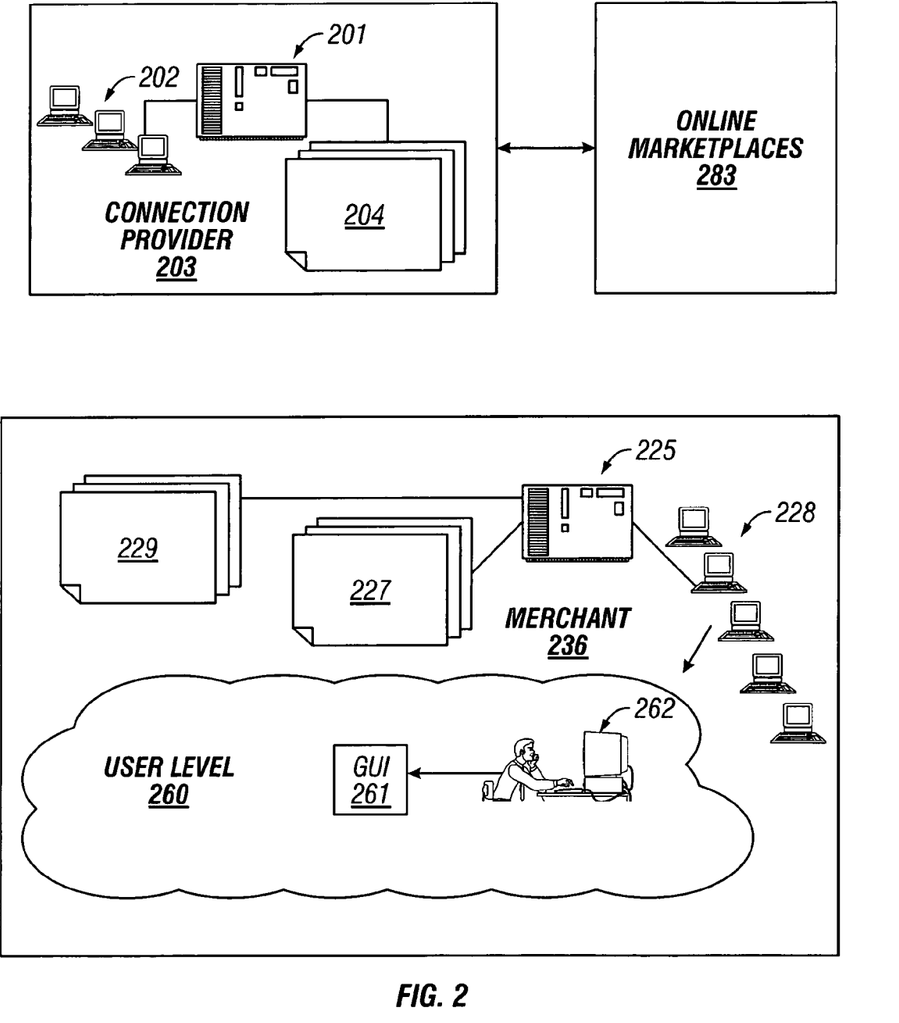
FIG. 2 is an exemplary block diagram of a computer system architecture.

FIG. 2 shows an exemplary architectural block diagram of a connection system. The seller or merchant 236 may employ one or more computer system users 262 to enter information for one or more items for sale in a graphical user interface 261. The merchant's computer system may have a repository or database 225 with files, objects, and documents 227, 229 with information describing the merchant's items, businesses, financial information, human resource information, etc. Typically, the information describing the merchant's items for sale is recorded and maintained at the level of a SKU (Stock-Keeping Unit)—a unique identifier, usually alphanumeric, of a particular product that allows it to be tracked for inventory purposes. The merchant's information may be accessed in a network of computers 228. The merchant's system may also be on a physically distributed system, in which information may reside on one or more computers 228 and databases 225, and may be accessed by one or more users 262. The merchant 236 may transmit SKU information—typically in the form of a PDF—to a connection provider 203, which then uses the information to list the items for sale on one or more online marketplaces 283. The information transmitted to and received from the connection provider 203 may include one or more of the following: business-specific information, such as sales and customer information; data within objects, spreadsheets, and text files; and business-related applications and logic. The information generated from the merchant 236 may be generated by a program or an automated process that may not require a user 262 or a corresponding graphical user interface 261.

At a basic level, the connection provider 203 offers item services between one or more merchants 236 and one or more online marketplaces 283. The connection provider may have a computer system architecture that includes objects, documents 204 and information residing on one or more repositories or databases 201. The information may be networked among multiple computers 202. The connection provider 203 may or may not share hardware resources with the online marketplaces 283.

The connection provider may also receive information from multiple sellers (not shown) regarding the items they are selling. The connection provider can facilitate a sale of the items through one or more online sales channels. The items may sell at different times and in different quantities and may sell to different customers on several online sales channels. The connection provider can then facilitate the fulfillment of sold items through one or more fulfillment centers controlled by a connection provider, in which at least one fulfillment center can be operated according to one or more parameters that are tailored to a common requirement or characteristic of the sold items.

Figure 3:
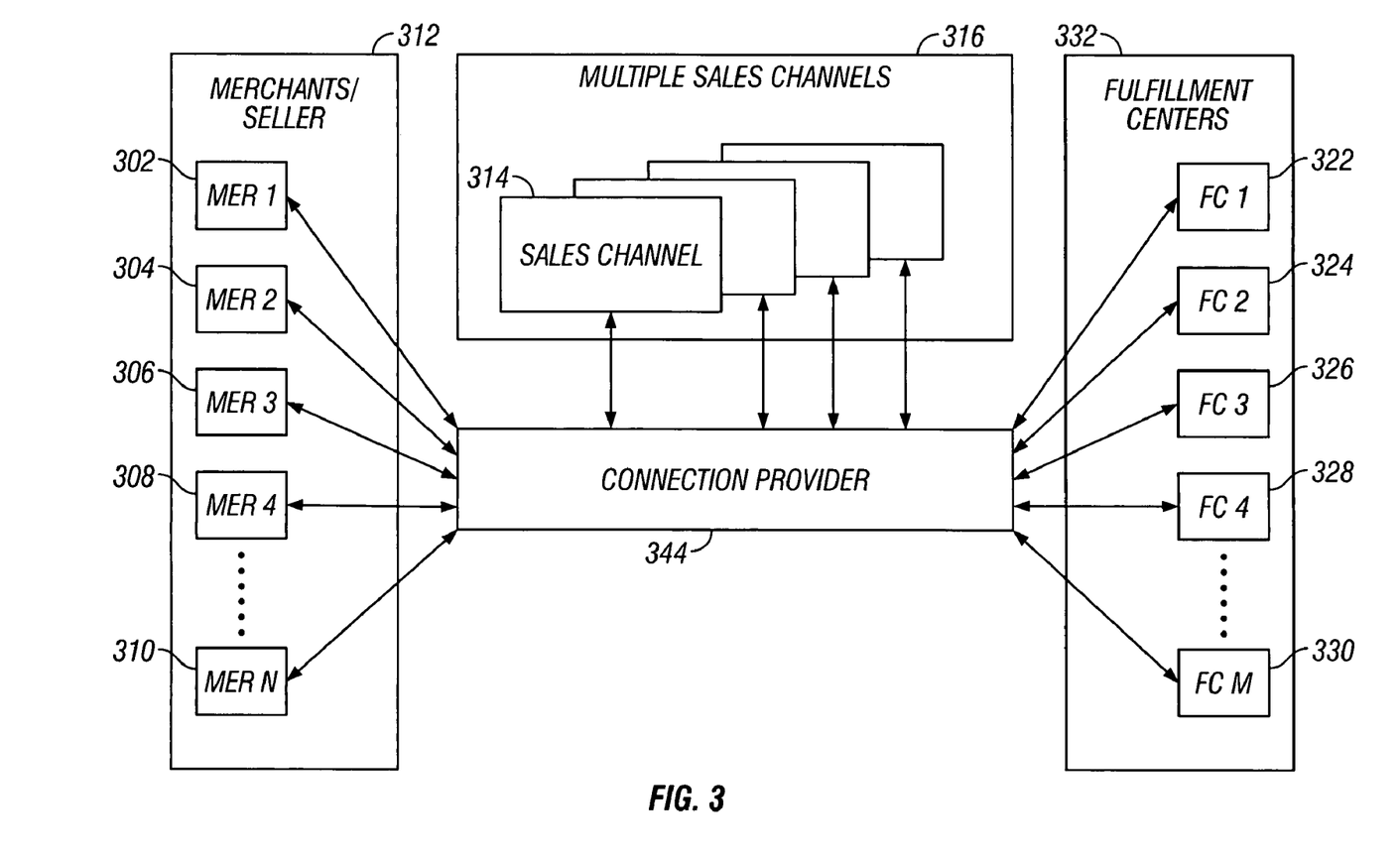
FIG. 3 is an exemplary block diagram of a connection architecture.

FIG. 3 is a block diagram of a connection architecture in which a connection provider 344 facilitates one or more merchants/sellers 312 access and/or connection to one or more online sales channels 316. As described in FIG. 2, the connection provider 344 may receive information from a seller 312, in which the information describes one or more items for sale by the seller. As described in more detail below, the connection provider 344 may provide different levels of service to different merchants. The connection provider 344 may facilitate a sale of the item through one or more online sales channels 314. The connection provider 344 may also facilitate fulfillment of the item for sale with a fulfillment center 332. In a typical implementation, the connection provider 344 provides software infrastructure (e.g., data communications and user interface capabilities) that enable a merchant/seller 312 to provide information describing one or more items to be sold on an online sale channel. The connection provider 344 then lists the items for sale on one or more online sales channels 316 and, depending on the level of service selected by the seller/merchant 312, can fulfill an order (that is, a consummated sale) of an item using a fulfillment center 332 that is appropriate to the nature of the item sold.

The fulfillment centers 312 may have one or more parameters tailored to characteristics, features and/or processing requirements of the sold item. For example, FC1 may correspond to a "new-in-box" fulfillment center that handles fulfillment of sales of items that are sold as new in boxes as received from the item's manufacturer (e.g., TV sets or laptop computers). FC2 may, for example, correspond to a "refurbishment" fulfillment center that receives used, and potentially damaged, items from a seller and then refurbishes them as needed to place them in condition for sale. Such refurbishment may include activities such as cleaning, reformatting, replacing consumable components, re-labeling, certifying and/or virtually anything else needed to place the items in the desired condition for sale. Computer equipment that has been used internally by a seller's employees, and which is being upgraded or replaced, is an example of the types of items that may be fulfilled through a refurbishment fulfillment center.

Further, FC3 may correspond to a "fragmented inventory" fulfillment center. In this type of fulfillment center, a seller typically has a collection of various odds and ends that it wants to sell through an online sales channel. In many case, these odds and ends may not be part of regular inventory and be in various states of disorganization or disrepair. For example, following a large scale or after taking inventory, a department store may discover that it has many items that are close-outs, last of kind, odd sizes, mis-marked on unlabeled, and so on. Because in many cases such odds and ends are not adequately recorded in the seller's inventory database, the seller may be unable to prepare or send a Product Definition File that describes these items at a SKU level.

To dispose of these odds and ends the department store can load up the items and send them directly to a fragmented inventory fulfillment center, which will then process the items, for example, by organizing, labeling, pricing, inventorying, assigning SKUs, re-conditioning, grouping, photographing (e.g., for display on the online sales channel website) and so on. An end result of such processing by a fragmented inventory fulfillment center typically would include the creation of an electronic data file, such as a Product Definition File describing each of the fragmented inventory items at a SKU level, which could then be transmitted to the connector provider's computer systems by the fulfillment center. Note that such an implementation of a fragmented inventory fulfillment center provides an additional level of service to the seller—namely, the creation and maintenance of the Product Definition File for the items to be sold by the connection provider.

Among the other functions described here, the fulfillment center 332 also may serve as a warehouse, shipping, storage, or distribution center for the items sold. The connection provider 344 may, at least at some level, control the fulfillment centers 332, and at least one of the fulfillment centers 332 may be operated according to one or more parameters tailored to the sold items. Because a fulfillment center may provide one or more services, and/or have one or more parameters relating to fulfilling orders for items sold for multiple sellers, there may be at least one fulfillment center to fulfill sales of items owned by multiple, different sellers but which has at least some features, characteristics and/or processing requirements in common. Hence, multiple sellers may share a common fulfillment center due to a commonality related to a particular fulfillment center's parameters. Similarly, sales of a single merchant's items may be fulfilled through multiple different fulfillment centers, each fulfillment center selected depending on features, characteristics, or processing requirements of the various items being sold by the seller through the online sales channel.

As used herein, a fulfillment center controlled by the connection provider encompasses both fulfillment centers that are owned and/or operated by the connection provider as well as fulfillment centers that are outsourced to a third party, but which are operated, at least in part, according to one or more parameters defined by the connection provider.

The connection provider 344 may be an intermediary that facilitates access to one or more online sales channels 316 and which neither takes title and/or possession of the items being sold. The merchants 312 may include small businesses, large companies, organizations, individuals, or other entities selling an item. The fulfillment centers 332, which can be controlled but not necessarily owned by the intermediary, can fulfill orders from multiple merchants 312 having the same type or nature of items. The fulfillment centers 332 may be owned, operated or dedicated to one or more of the merchants 308. The fulfillment centers 332 may also be owned and operated independently of the merchants 312, the online sales channels 316, and/or the intermediary 344. The online sales channels 316 may include multiple web sites listing the items being sold. Alternatively, one or more of the online sales channels may be operated or controlled by the connection provider 344.

The merchants 312 may offer various items for sale with different properties, characteristics or fulfillment requirements. The connection provider 344 can identify and coordinate the fulfillment of an item for sale with a fulfillment center 312 that is tailored to a parameter to that item for sale. As described above, a fulfillment center may be tailored according to a set of one or more activities that are required for preparation of items prior to delivery to the buyer. Moreover, the connection provider 344 can identify a fulfillment center 322 that has particular environmental characteristics tailored to the items being sold, such as refrigeration for chocolate or flowers sold from merchant 302, in which a key parameter for the item sold is the temperature at which the inventory is stored. In another example, a key parameter of identifying the fulfillment center 324 can be geography—that is, the connection provider 344 can identify a fulfillment center 324 that, e.g., is geographically located near a certain agricultural facility for certain produce for a merchant 304. In general, one or more parameters may be associated with an item being sold and one or more parameters may be associated with a fulfillment center 326. An identified fulfillment center 326 may be tailored for one or a combination of parameters or characteristics for an item being sold.

As discussed in connection with FIG. 2, the merchant 236 can send information to and receive information from the connection provider 203. The sent information may include details and descriptions on the items for sales and any relevant parameters related to those items. After the merchant sends the information to the connection provider, the merchant may elect to have the connection provider coordinate all or part of the fulfillment obligations of the order. The connection provider 203 may process the information and select one or more fulfillment centers 283 based on one or more parameters from the item being sold. The information for the fulfillment centers, including parameter information, may reside on a database 201 in the connection provider's facilities.

In FIG. 3, the information sent from a merchant 312 to the connection provider 344 may include metadata or an eXtensible Markup Language (XML) object with one or more parameters of the items being sold. Instead of, or in addition to an XML object, the information sent from the merchant may include two or more objects, with one object containing information for the items being sold, and another object with information regarding one or more parameters. The term "object" may refer to information sources such as documents, reports, presentations, files and directories. Alternatively, the information sent from the merchant 312 to the connection provider 344 may be a single Product Definition File delineating the items at a SKU (Stock Keeping Unit) level. The connection provider 344 may also provide a dedicated portal interface to merchants, in which a merchant can transmit information through the portal to the connection provider in a secure, pre-determined format.

The identification of an appropriate fulfillment center 332 typically is performed manually, for example, by a human operator associated with the seller or the connection provider.

However, identification of a fulfillment could be performed, at least in part, by an automated process, for example, based on information received from the seller. But in a typical implementation, identification of an appropriate fulfillment center 332 for an item is manually performed by an operator associated with the connection provider system. The connection provider can determine the parameters for the items being sold and can manually identify an appropriate fulfillment center. In this implementation, a merchant need not send parameter information for the items being sold.

In another implementation, the merchant sends parameter information to the connection provider only once during initial setup of the merchant's account or relationship. If a merchant intends to sell only one type of item then the merchant does not need to resend parameter information along with information for the items for sale.

The connection provider 344 may provide different levels of service to different merchants. In one or more service levels described below (FIG. 7), the connection provider 344 may provide total sales channel facilitation services to the seller 312 of the items. For instance, the connection provider (e.g., Accenture) 344 may provide a broad range of sales channel facilitation services, such as billing services, collection services, advertisements, and customer service. The customer service capabilities may include a tool to interface with a buyer, in which the customer service tool may present contact information and policies for the connection provider and online sales channel.

Other sales channel facilitation services may include inventory management, transportation management, order management, and listing tools. The listing tools can include providing descriptions, categories, keywords, titles, and scheduling for the items being sold. The listing tools can include pictures and descriptions of the items being sold. The connection provider can provide information about the seller, which can include a presentation of ratings of the seller from other previous buyers to provide post-transaction feedback. Potential buyers can examine the seller's feedback profile before bidding to rate the seller's items and trustworthiness.

The connection provider 344 can monitor a progress of the selling performance of the items. The connection provider 344 also can provide online auction capabilities and the ability to monitor auctions as they progress. The connection provider can help the merchant to formulate auction strategies based upon the merchant and/or the items being sold. For example, the connection provider 344 can suggest an auction duration period (e.g., 7 days), pricing (e.g., $10), and start and end times (e.g., 1 pm EST from one Friday to the following Friday) for the auction. The connection provider 344 also can provide various types of auctions, such as Dutch, Chinese, BIN, Large Lot, and Fixed Price.

After an item has been purchased, the connection provider 344 can inform a merchant 310 that a particular item has been purchased on a particular online sales channel 314 to be fulfilled by one or more fulfillment centers 332. The connection provider 344 can also provide data and statistics to the merchant 310 on the buyer and the sale of the item. The connection provider 344 may have a financial tool to report transactions to the merchant 310. The connection provider 344 may inform the merchant 310 (e.g., with an electronic mailing) of purchases or the number of bids on their items. The email to the merchant 310 may be automatically generated by a program and sent from the connection provider 344.

Figure 4:
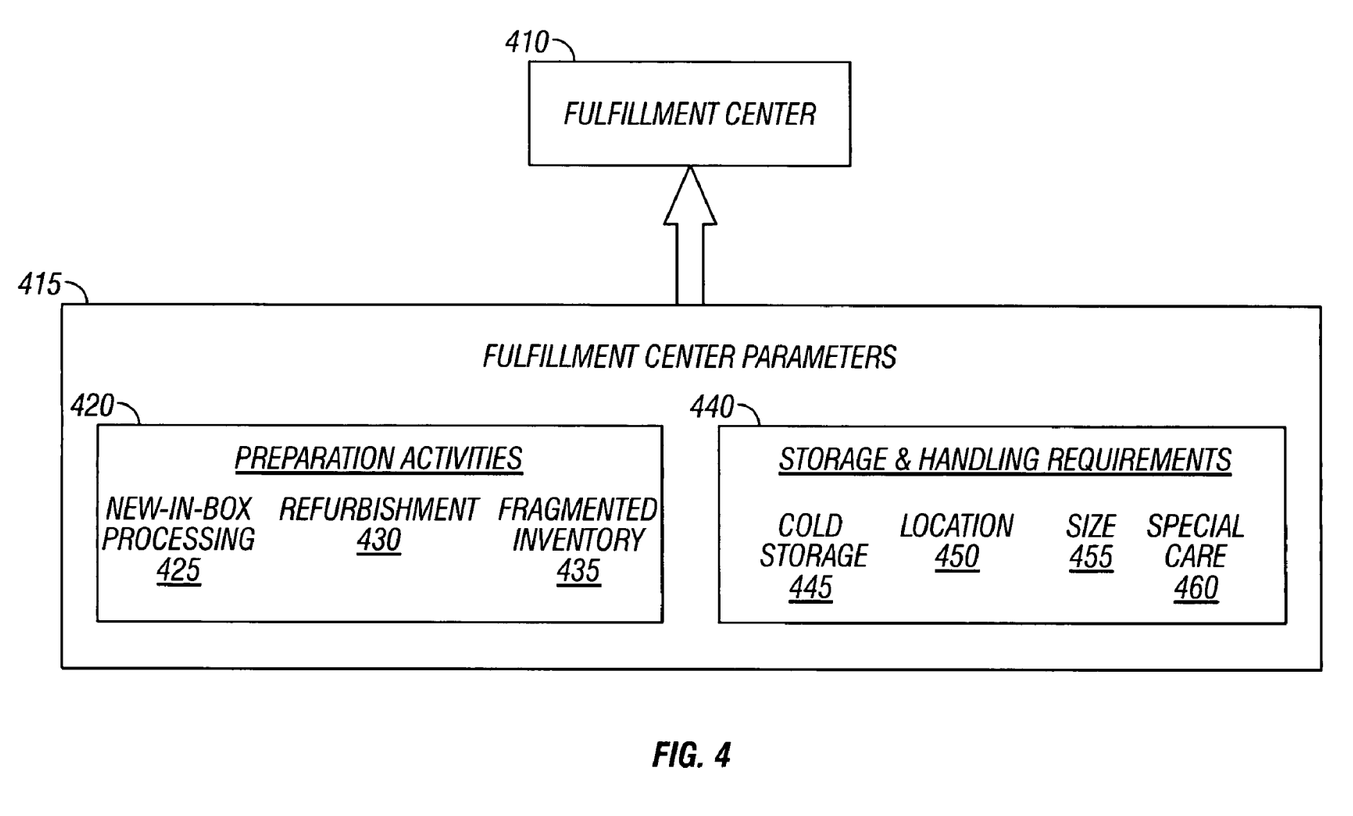
FIG. 4 is a block diagram showing exemplary fulfillment parameters.

FIG. 4 is a block diagram illustrating examples of parameters that may be used in tailoring fulfillment of sold items. In one implementation, a fulfillment center 410 may be tailored according to two different types of parameters—preparation activities 420 and storage & handling requirements 440. Preparation activities 420 include the activities that the fulfillment center is to undertake to ready the merchandise for fulfillment of a sold item. Examples of preparation activities include new-in-box processing 425, refurbishment 430 and fragmented inventory handling 435 as described above. Storage & handling requirements 440 include characteristics that the fulfillment center should possess in order to properly store and handle the merchandise being sold. Examples of storage & handling requirements include cold storage 445 capability for perishable items, a particular location 450 or multiple distributed locations for the fulfillment center, the ability for the fulfillment center to handle items of a particular size 455 (e.g., very big or very small), and/or the ability to provide special care 460 handling for items—e.g., safety procedures for handling potentially dangerous materials such as chemicals or explosives, a special storage environment for delicate items such as antiques or collectibles, and so on.

Note that in tailoring a fulfillment center to a particular type of items, that different or additional parameters may be selected or used as appropriate for the merchandise being sold and/or to satisfy the sellers. In particular, the parameters used to tailor the fulfillment center may be different from, or in addition to, preparation activities or storage & handling requirements as described in connection with FIG. 4. For example, a fulfillment center may provide tailored services unrelated to item preparation, storage or handling such as clearing customs on the items, authenticating unique or collectable items, and so on. In addition, virtually any combination of services, preparation activities and/or storage & handling parameters may be used in tailoring a fulfillment center for a particular type or types of items being sold. In general, the connection provider 344 (FIG. 3) can set up and maintain fulfillment centers that satisfy a wide range of parameters for items being sold. The connection provider 344 also can locate and coordinate an appropriate fulfillment center for those items.

FIG. 5 is a flowchart illustrating a process for facilitating access to one or more online sales channels and fulfillment of orders for items being sold. As described in FIGS. 2 and 3, a merchant can send information to the connection provider 510 describing the items to be sold on an online sales channel. Alternatively, the information for the items being sold may also include a time period for selling those items, start and target prices for selling the items, and a quantity of the items. The information may also include one or more characteristics or parameters for the items, and one or more preferred fulfillment centers.

The connection provider can arrange for the merchant's items to be sold through one or more online sales channels 515 (e.g., eBay). If the merchant specifies that it would like for the connection provider also to provide fulfillment service 520, the connection provider can select a specialized fulfillment center based on the parameters and/or nature of the items being sold 525. If the fulfillment service 520 is not selected by the merchant, the merchant itself can arrange for fulfillment of the items being sold 535.

Figure 6:
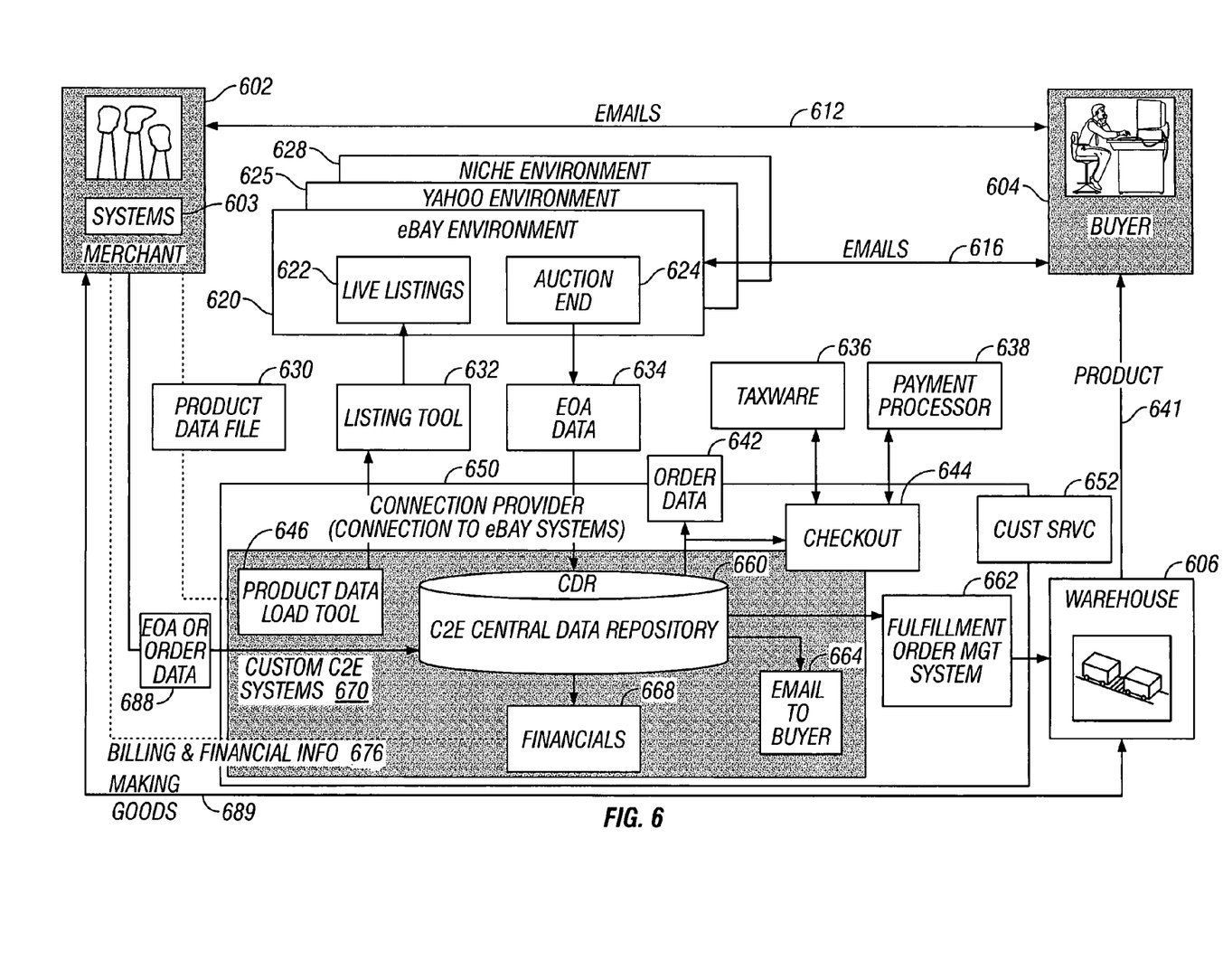
FIG. 6 is an exemplary system architecture block diagram.

FIG. 6 is a system architectural block diagram of a system that may be used to facilitate connections to online sale channels and provide tailored fulfillment services. The block diagram shows a merchant 602, a buyer 604, a fulfillment center/warehouse 606, a connection provider 650, and one or more online sales channels 620, 625, 628. A merchant 602 can send a product data file 630 containing the information for the items for sale to the connection provider 650. A product data loading tool 646 from the connection provider 650 can load the information from the product date file 630. The connection provider 650 may have a central data repository 660 that can store information related to the operations of the connection provider 650. The connection provider may have custom customer-to-enterprise (C2E) systems that allow merchants 602 to sell items to large enterprises 604.

The connection provider 650 can process the information from the merchant 602 and can utilize a listing tool 632 to conduct listings 622 on one or more online sales channels 620, 625, 628. In this exemplary implementation, an eBay environment 620 may be one of the online sales channels. Other online sales channels may include a niche environment 628, or an environment 625 in another multi-purpose web site, such as Yahoo, Inc. of Sunnyvale, Calif. The online sales channel 620 may communicate 616 and conduct transactions with a buyer 604. At the end of an auction or a transaction 624, the end-of-auction (EOA) data 634 is sent to the central data repository 660 in the connection provider 650. The connection provider 650 then can arrange, process, and coordinate transactional and sales channel facilitation services for the order 642, 638, including shipping and checkout functions 644, as well as handling taxes 636 for different items and geographic regions.

The connection provider 650 can manage and fulfill the order based on one or more parameters of the purchased items. If the merchant 602 selects fulfillment services from the connection provider, a fulfillment order management system 662 can select an appropriate warehouse 606 as a fulfillment center for the purchased items. The warehouse 606 can arrange to handle the sold items 641 between the merchant 602 and the buyer 604. The merchant 602 may also indicate in the product data file 630 to the connection provider 650 that a particular warehouse 606 is preferred.

Upon purchase of the items, the connection provider 650 can provide financial information 676 to the merchant 602 and send a confirmation message 664 to the buyer 604. The connection provider 650 may also provide other customer service functions 652 to the merchant 602, buyer 604, warehouse 606, and/or multiple online sales channels 602, 625, 628.

Figure 7:
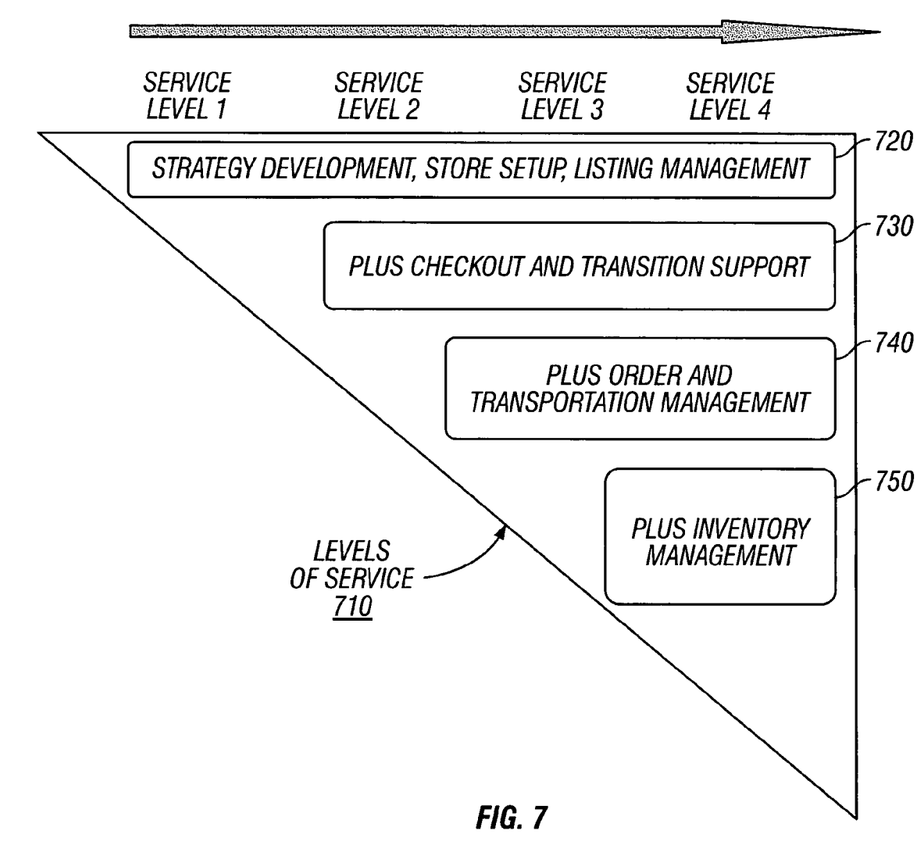
FIG. 7 is an exemplary system level diagram.

FIG. 7 is a diagram depicting examples of levels of service that may be provided by a connection provider. In this example, the connection provider provides four levels of service for auction management and fulfillment capabilities, with level 4 representing the highest level of service. The first level of service, level 1, can represent a standard level of service and the fourth level of service, level 4, can represent a fully outsourced solution. A merchant or seller may elect to have the connection provider to provide any one of the four levels of service.

In the first level of service, the connection provider can provide strategy development, a storefront initiation and setup, and listing management. The connection provider can include a pricing strategy, such as selecting an auction strategy and a type of auction. Listing strategies can be provided as well. Listing strategies may include strategies on the listing titles, keywords, descriptions, pictures, and other items that may impact bidding activity. Other first level services can include email management, online storefront development, and auction listing and management.

The second level of service can include the services in the first level of service in addition to checkout and transaction support. The connection provider may offer hosted checkout services, payment processing, and customer support services. The customer support services may include customer inquiry and transaction support through a call center.

The third level of service can include the services in the first and second levels of service, in addition to order and transportation management. These services can include the creation of packing lists and shipping labels. Shipping arrangement services can also be provided, and customer service can support transportation logistics.

The fourth level of service can include the services of the first, second, and third levels of service in addition to inventory management. The fourth level may involve the connection provider in consignment responsibilities. Such responsibilities may include receiving, inspecting, storing, packing, and/or shipping the items, and may involve the use of one or more fulfillment centers.

As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

The disclosed software, techniques, and systems described herein may use software and structures available from the connection provider. Instead of or in addition to software and systems supplied by the connection provider, the disclosed software and systems may coexist or operate with software and systems provided by third parties.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on one or more computers each having a display device (e.g., a CRT (cathode ray tube) or LCD (liquid crystal display) monitor) for displaying information to the user and a keyboard and a pointing device (e.g., a mouse or a trackball) by which the user can provide input to the computer. For example, a buyer may view information from an online sales channel with a graphical user interface presented on a display device as shown in FIG. 2. Other kinds of devices can be used to provide for interaction with a user as well. For example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients (FIG. 2) and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the parameters listed in FIG. 4 may include other parameters for specific merchants and/or items. The user interfaces described above may be referred to as panels, palettes, pages, views, or portions of other interfaces. The logic flow depicted in FIG. 5 does not require the particular order shown, or sequential order, to achieve desirable results. Accordingly, other implementations are within the scope of the following claims.

What is claimed is:

1. A method comprising:
   receiving, at a connection provider computer system from a seller's computer system, information describing one or more items for sale by the seller, the connection provider computer system being operated by a connection provider;
   developing, using the connection provider computer system and based on the information describing the one or more items for sale by the seller, a pricing and listing strategy for selling the one or more items on one or more online sales channels selected, from among multiple potential online sales channels, as being appropriate for selling the one or more items;
   facilitating, using the connection provider computer system, a sale of the one or more items through the one or more selected online sales channels based on the pricing and listing strategy;
   determining, using the connection provider computer system and from among multiple, different levels of service, a level of service selected by the seller, the multiple, different levels of service including a first level of service in which the connection provider allows the seller to fulfill orders through the seller's own fulfillment centers and a second level of service in which the connection provider fulfills orders for the seller through one or more tailored fulfillment centers; and
   in response to a determination that the level of service selected by the seller is the second level of service in which the connection provider fulfills orders for the seller through one or more tailored fulfillment centers;
   determining, using the connection provider computer system, parameters related to preparation activities needed to ready the one or more items for fulfillment of a sale and storage and handling requirements indicating characteristics that a fulfillment center needs to possess in order to properly store and handle the one or more items, the determined parameters being different than the information describing the one or more items for sale by the seller and being determined without the seller providing parameter information for the one or more items being sold;
   using the connection provider computer system to select, from among multiple potential fulfillment centers based on the determined parameters related to preparation activities and storage and handling requirements, one or more fulfillment centers tailored to fulfilling orders of items having properties in common with the one or more items; and
   facilitating, using the connection provider computer system, fulfillment of sold items through the one or more selected fulfillment centers tailored to fulfilling orders of items having properties in common with the one or more items,
   wherein the connection provider is a separate legal entity from the seller and from entities operating the multiple potential online sales channels, and
   wherein the connection provider services multiple, different sellers and facilitates fulfillment of items from multiple, different sellers through the one or more selected fulfillment centers.

2. The method of claim 1 wherein facilitating, using the connection provider computer system, fulfillment of sold items through the one or more selected fulfillment centers tailored to fulfilling orders of items having properties in common with the one or more items comprises tailoring storage or handling characteristics of the fulfillment center to the type of items sold.

3. The method of claim 1 wherein facilitating, using the connection provider computer system, fulfillment of sold items through the one or more selected fulfillment centers tailored to fulfilling orders of items having properties in common with the one or more items comprises (i) performing preparation activities in connection with fulfilling orders for the items and (ii) tailoring storage or handling characteristics of the fulfillment center to the type of items sold.

4. The method of claim 1 wherein facilitating, using the connection provider computer system, fulfillment of sold items through the one or more selected fulfillment centers tailored to fulfilling orders of items having properties in common with the one or more items comprises an activity other than (i) performing preparation activities in connection with fulfilling orders for the items or (ii) tailoring storage or handling characteristics of the fulfillment center to the type of items sold.

5. The method of claim 1 wherein the connection provider comprises a non-title-taking intermediary that coordinates fulfillment of the sold items.

6. The method of claim 1 wherein facilitating a sale of the items includes providing customer service on behalf of one or more sellers.

7. The method of claim 6 wherein facilitating a sale of the items further comprises:
   providing billing services; and
   providing collection services.

8. The method of claim 7 wherein facilitating a sale of the items further comprises:
provide online auction capabilities;
providing listing tools; and
monitoring a progress of the selling performance of the items.

9. The method of claim 6 wherein facilitating a sale of the items further comprises:
developing a selling strategy for the items being sold;
managing orders and transportation of the items being sold; and
managing inventory for the items being sold.

10. A device comprising:
an interface configured to receive, from a seller's computer system, information describing one or more items for sale by the seller; and
a processor configured to:
develop, based on the information describing the one or more items for sale by the seller, a pricing and listing strategy for selling the one or more items on one or more online sales channels selected, from among multiple potential online sales channels, as being appropriate for selling the one or more items;
facilitate a sale of the one or more items through the one or more selected online sales channels based on the pricing and listing strategy;
determine, from among multiple, different levels of service, a level of service selected by the seller, the multiple, different levels of service including a first level of service in which a connection provider allows the seller to fulfill orders through the seller's own fulfillment centers and a second level of service in which the connection provider fulfills orders for the seller through one or more tailored fulfillment centers; and
in response to a determination that the level of service selected by the seller is the second level of service in which the connection provider fulfills orders for the seller through one or more tailored fulfillment centers;
determine parameters related to preparation activities needed to ready the one or more items for fulfillment of a sale and storage and handling requirements indicating characteristics that a fulfillment center needs to possess in order to properly store and handle the one or more items, the determined parameters being different than the information describing the one or more items for sale by the seller and being determined without the seller providing parameter information for the one or more items being sold;
select, from among multiple potential fulfillment centers based on the determined parameters related to preparation activities and storage and handling requirements, one or more fulfillment centers tailored to fulfilling orders of items having properties in common with the one or more items; and
facilitate fulfillment of sold items through the one or more selected fulfillment centers tailored to fulfilling orders of items having properties in common with the one or more items,
wherein the device is operated by a connection provider that is a separate legal entity from the seller and from entities operating the multiple potential online sales channels, and
wherein the connection provider services multiple, different sellers and facilitates fulfillment of items from multiple, different sellers through the one or more selected fulfillment centers.

11. The device of claim 10 wherein the processor is configured to facilitate fulfillment of sold items through the one or more selected fulfillment centers tailored to fulfilling orders of items having properties in common with the one or more items by tailoring storage or handling characteristics of the fulfillment center to the type of items sold.

12. The device of claim 10 wherein the processor is configured to facilitate fulfillment of sold items through the one or more selected fulfillment centers tailored to fulfilling orders of items having properties in common with the one or more items by (i) performing preparation activities in connection with fulfilling orders for the items and (ii) tailoring storage or handling characteristics of the fulfillment center to the type of items sold.

13. The device of claim 10 wherein the processor is configured to facilitate fulfillment of sold items through the one or more selected fulfillment centers tailored to fulfilling orders of items having properties in common with the one or more items by performing an activity other than (i) performing preparation activities in connection with fulfilling orders for the items or (ii) tailoring storage or handling characteristics of the fulfillment center to the type of items sold.

14. The device of claim 10 wherein the connection provider comprises a non-title-taking intermediary that coordinates fulfillment of the sold items.

15. The device of claim 10 wherein the processor is configured to facilitate a sale of the items by providing customer service on behalf of one or more sellers.

16. The device of claim 15 wherein the processor is further configured to:
provide billing services; and
provide collection services.

17. The device of claim 16 wherein the processor is further configured to:
provide online auction capabilities;
provide listing tools; and
monitor a progress of the selling performance of the items.

18. The device of claim 15 wherein the processor is configured to:
develop a selling strategy for the items being sold;
manage orders and transportation of the items being sold; and
manage inventory for the items being sold.

19. A computer storage medium encoded with a computer program, the program comprising instructions that when executed by data processing apparatus cause the data processing apparatus to perform operations comprising:
receiving, at a connection provider computer system from a seller's computer system, information describing one or more items for sale by the seller, the connection provider computer system being operated by a connection provider;
developing, using the connection provider computer system and based on the information describing the one or more items for sale by the seller, a pricing and listing strategy for selling the one or more items on one or more online sales channels selected, from among multiple potential online sales channels, as being appropriate for selling the one or more items;
facilitating, using the connection provider computer system, a sale of the one or more items through the one or more selected online sales channels based on the pricing and listing strategy;

determining, using the connection provider computer system and from among multiple different levels of service, a level of service selected by the seller, the multiple, different levels of service including a first level of service in which the connection provider allows the seller to fulfill orders through the seller's own fulfillment centers and a second level of service in which the connection provider fulfills orders for the seller through one or more tailored fulfillment centers;

in response to a determination that the level of service selected by the seller is the second level of service in which the connection provider fulfills orders for the seller through one or more tailored fulfillment centers:

determining, using the connection provider computer system, parameters related to preparation activities needed to ready the one or more items for fulfillment of a sale and storage and handling requirements indicating characteristics that a fulfillment center needs to possess in order to properly store and handle the one or more items, the determined parameters being different than the information describing the one or more items for sale by the seller and being determined without the seller providing parameter information for the one or more items being sold;

using the connection provider computer system to select, from among multiple potential fulfillment centers based on the determined parameters related to preparation activities and storage and handling requirements, one or more fulfillment centers tailored to fulfilling orders of items having properties in common with the one or more items; and     facilitating, using the connection provider computer system, fulfillment of sold items through the one or more selected fulfillment centers tailored to fulfilling orders of items having properties in common with the one or more items, wherein the connection provider is a separate legal entity from the seller and from entities operating the multiple potential online sales channels, and wherein the connection provider services multiple, different sellers and facilitates fulfillment of items from multiple, different sellers through the one or more selected fulfillment centers.

\* \* \* \* \*

UNITED STATES PATENT AND TRADEMARK OFFICE
CERTIFICATE OF CORRECTION

| | | |
|---|---|---|
| PATENT NO. | : 7,707,074 B1 | Page 1 of 1 |
| APPLICATION NO. | : 10/658671 | |
| DATED | : April 27, 2010 | |
| INVENTOR(S) | : Mark F. Cotton et al. | |

It is certified that error appears in the above-identified patent and that said Letters Patent is hereby corrected as shown below:

Column 14, line 2 delete "centers;" and insert -- centers: --, therefor.

Column 15, line 41-42 delete "centers;" and insert -- centers: --, therefor.

Column 17, line 2 delete "multiple" and insert -- multiple, --, therefor.

Column 17, line 9 after "centers;" insert -- and --.

Signed and Sealed this

Sixth Day of July, 2010

David J. Kappos
*Director of the United States Patent and Trademark Office*